(12) United States Patent
Johnstone

(10) Patent No.: US 7,396,498 B1
(45) Date of Patent: *Jul. 8, 2008

(54) ORIENTATION OF FILMS TO IMPROVE BARRIER AND UV STABILITY

(75) Inventor: Peter Johnstone, Reservoir (AU)

(73) Assignee: Integrated Packaging Australia Pty. Ltd., Victoria (AU)

( * ) Notice: Subject to any disclaimer, the term of this patent is extended or adjusted under 35 U.S.C. 154(b) by 0 days.

This patent is subject to a terminal disclaimer.

(21) Appl. No.: 09/720,173

(22) PCT Filed: Jun. 23, 1999

(86) PCT No.: PCT/AU99/00510

§ 371 (c)(1),
(2), (4) Date: Dec. 20, 2000

(87) PCT Pub. No.: WO99/67080

PCT Pub. Date: Dec. 29, 1999

(30) Foreign Application Priority Data

Jun. 23, 1998 (AU) .................................... PP4294
Dec. 16, 1998 (AU) .................................... PP7740

(51) Int. Cl.
*B29C 41/00* (2006.01)
*B29C 49/08* (2006.01)
*B29C 55/00* (2006.01)
*B65B 13/02* (2006.01)
*B65B 29/00* (2006.01)
*B65B 53/00* (2006.01)

(52) U.S. Cl. .................. 264/230; 264/288.4; 264/289.6; 264/290.2; 264/291; 53/399; 53/401; 53/441; 53/556

(58) Field of Classification Search .................. 264/230, 264/288.4, 289.6, 290.2, 290.5, 291; 156/229; 428/34.1, 98, 221, 411.1; 53/399, 401, 441, 53/556

See application file for complete search history.

(56) References Cited

U.S. PATENT DOCUMENTS

| 4,098,860 | A |   | 7/1978 | Etou et al. |
| 4,680,207 | A | * | 7/1987 | Murray ..................... 428/35.2 |
| 5,458,841 | A |   | 10/1995 | Shirrell |
| 5,797,240 | A | * | 8/1998 | Martin-Cocher et al. ...... 53/399 |
| 5,816,026 | A | * | 10/1998 | Orpen ......................... 53/441 |
| 6,168,840 | B1 | * | 1/2001 | Johnstone ................ 428/36.91 |
| 6,383,430 | B1 | * | 5/2002 | Johnstone ................... 264/146 |

FOREIGN PATENT DOCUMENTS

| EP | 0 225 631 | A2 |   | 6/1987 |
| GB | 2 063 809 | A |   | 6/1981 |
| GB | 2 083 002 | A |   | 3/1982 |
| WO | WO 94/04419 |   | * | 3/1994 |
| WO | WO 98/50219 |   | * | 11/1998 |
| WO | WO 98/50219 | A1 |   | 11/1998 |

* cited by examiner

*Primary Examiner*—Sheeba Ahmed
(74) *Attorney, Agent, or Firm*—Alston & Bird LLP

(57) ABSTRACT

The invention disclosed herein relates to a method of treating plastics material fibers, filaments or film to improve their resistance to degradation by UV radiation and/or increase their resistance to gas (oxygen) transmissivity and an improved plastics material so treated, the method including stretching the fiber, filament or film beyond its yield point and allowing the film to at least partially relax.

20 Claims, 3 Drawing Sheets

ORIENTATION OF FILMS TO IMPROVE BARRIER AND UV STABILITY

The present invention relates to improved methods of processing plastics material film to decrease their permeability to oxygen or other gases and/or to improve their resistance to degradation from ultra-violet light radiation.

Many plastics material films, fibres or filaments are used in external applications where they are subject to ultra-violet radiation and may therefore degrade more quickly than would otherwise be expected. Such applications include (but are not limited to) coverings for shade or propagation houses, shade cloth, nets, ropes and cords, tarps, agricultural films including ground cover sheets or webs to protect plants or prevent weed growth, garbage or trash collection bags, films and wrapping material for silage production. With such applications, it is often desirable to increase their useful life by increasing their resistance to ultra-violet (UV) degradation or alternatively to at least maintain their current life capabilities while reducing their costs. It is known to use various additives to the resin formulation used to manufacture films, fibres and filaments to increase their ability to resist UV degradation, however, the use of such additives increase the complication and cost of such plastics material film, fibre and filament production.

It has further been recognised, at least in relation to industrial or commercial packaging/wrapping applications, that less plastic material film in volume can be used if the film is produced with reduced thickness levels and typically with thickness levels that cannot be reliably produced by conventional extrusion techniques. These films are produced by stretching techniques beyond the yield point of the plastics material film such that the film length is substantially increased and its thickness is reduced. Examples of such films and methods of producing same may be found in Australian Patent Specification No. 643902 and German Specification No. P3409117.

In certain further applications, it is desirable to provide a plastics material film that has an increased resistance to the transmission of oxygen (or other gases) through the film. Such applications might include wrapping the film to form a container or envelope for any object or material that would benefit from an anaerobic atmosphere during storage. One particular application of this type is of course the production of silage where a bale of silage making material such as wilted grass is wrapped in an anaerobic envelope of plastics material film. It has not, however, been thought to use stretched film of the type disclosed in Australian Patent Specification No. 643902 or German Specification No. P3409117 for use in applications where an anaerobic envelope is desired because of a perceived likelihood that there would be an unacceptably high increase in the flow rate of oxygen through such thinned plastics material film. Moreover, it was considered possible that increased oxygen levels within the plastics material film could increase the likelihood of degradation of the film by ultra-violet radiation when the film might be used in applications where they would be subject to ultra-violet light radiation.

An objective therefore of the present invention is to provide a plastics material product and a method of making same where the plastics material of the product has either or both an improved resistance to UV degradation, and an improved resistance to the transmission of oxygen or other gases. A preferred objective is to provide both a pre-stretched plastics material film and a method of wrapping object(s) with pre-stretched plastics material film that will enable an anaerobic atmosphere to be maintained within the wrapping envelope. A still further preferred objective of the invention is to provide a method of wrapping material with pre-stretched plastics material to produce silage and of course a method of producing silage thereby.

Accordingly, in one aspect the present invention provides a method of forming a plastics material product including providing a plastics material member being a film, fibre or filament and stretching said member beyond its yield point to decrease its thickness and increase its length, at least partially relaxing said stretched plastics material member to form said product whereby the plastics material member achieves either or both (i) an improved resistance to degradation from UV light radiation, and (ii) an improved resistance to oxygen or other gas transmissivity, and forming said plastics material member into said product.

The present invention also provides a method of forming a plastics material product, said method including providing a plastics material member being a film, fibre or filament and stretching said member beyond its yield point to decrease its thickness and increase its length, and at least partially relaxing said stretched plastics material member to form said product whereby the plastics material member achieves either or both (i) an improved resistance to UV degradation, and (ii) an improved resistance to oxygen or other gas transmissivity.

According to the present invention there is also provided a plastics material member having a decreased oxygen permeability and increased resistance to UV degradation, said plastics material member being a film, fibre or filament, stretched beyond its yield point to decrease its thickness and increase its length, said plastics material member being at least partially relaxed.

There is provided according to the present invention a plastics material member having a decreased oxygen permeability, said product plastics material member being a film, fibre or filament, stretched beyond its yield point to decrease its thickness and increase its length, said plastics material member being at least partially relaxed.

There is also provided according to the present invention a plastics material member having an increased resistance to UV degradation, said plastics material member being a film, fibre or filament, stretched beyond its yield point to decrease its thickness and increase its length, said plastics material member being at least partially relaxed.

Preferably, the plastics material member is uniformly relaxed across its cross-section transverse to the stretching direction whereby the effects of either or both the resistance to UV degradation or barrier qualities occur evenly across the plastics material member. It has been surprisingly found that stretching plastics material and then relaxing same as aforesaid will normally achieve a significant improvement in resistance to UV degradation and also an improved resistance to oxygen and other gas transmissivity. This is achieved with a relatively simple manufacturing step and without the need of costly and complicated additives to the resin formulation although of course, the present invention does not exclude the possibility of including additives to the formulation to further enhance performance. The plastics material may be any polyolefin including LLDPE, octane, metallocenes, LDPE, HDPE, Polypropylene, Polystyrene, EVOH, EVA, PVC, Nylon or any combination of these resins.

When the plastics material member is film, the plastics material product formed may be the film itself or an anaerobic envelope formed by wrapping the film about an object or objects to be wrapped. When the plastics material is fibre or filament, the product formed may be ropes, cords or the like or knitted or woven products such as nets, shade cloth or the like.

According to this aspect, the present invention also provides a plastics material product having a decreased oxygen permeability and/or increased resistance to UV degradation, said product being formed from a plastics material member being a film, fibre or filament, stretched beyond its yield point to decrease its thickness and increase its length, said plastics material member being at least partially relaxed before being formed into said product.

Conveniently, the stretched plastics material member is relaxed by at least 5% of its total stretched length and up to or beyond 10% of its total stretched length. It has been recognised that stretching the film a second time after the film has been stretched and relaxed in accordance with this invention will not adversely affect the properties of the film.

It has further been recognised that the procedure of stretching and relaxing plastics material film as aforesaid improves the barrier properties of the film. It has further been recognised that stretching the plastics material film a second time after the initial stretch and relax process steps will not adversely affect either or both the barrier properties of the film and the resistance to UV degradation. If desired the film may be relaxed again after secondary or further stretching.

It may be desirable in some applications for the plastics material member to have no memory remaining in the material. In such applications, after the at least partial relaxation, the plastics material may be fixed at the length after relaxation by removal of memory through a process such as an annealing process, e.g. heating and immediately quenching (cooling), whereby contraction of the film is prevented. When the plastics material member fixed in length in this way is a film, said film may be laminated with at least one other material layer which may, for example, be another plastics material film layer, a metal film or foil layer, or combinations of same. It is of course also possible to laminate two or more films together, each of which have been separately treated in accordance with this invention, or alternatively laminate such films together prior to treatment and thereafter apply the procedures of this invention to the laminated film.

According to a further aspect of this invention, there is provided a method of wrapping a material, object or objects, to create an anaerobic atmosphere within a wrapping envelope, said method including providing an at least partially relaxed plastics material film pre-stretched beyond its yield point to increase its length and decrease its thickness, applying said pre-stretched plastics material film to be wrapped in at least one layer with at least sufficient applied further tension to form said wrapping envelope with an anaerobic atmosphere therewithin.

According to a further aspect, the present invention provides a method of wrapping a material, object or objects to create an anaerobic atmosphere within a wrapping envelope, said method including providing a plastics material film and stretching said film beyond its yield point to decrease the thickness and increase the length of the film, at least partially relaxing said stretched plastics material film, applying said partially or fully relaxed stretched plastics material film to be wrapped in at least one layer with at least sufficient applied further tension to form said wrapping envelope with an anaerobic atmosphere therewithin. Preferably the at least partially relaxing of said stretched plastics material film occurs uniformly across the full width of said film.

In accordance with yet a further aspect of the present invention, a plastics material film is provided, said film being first stretched beyond its yield point to increase its length and decrease its thickness, said film being at least partially relaxed. If desired, the film may be stretched again after the at least partial relaxation of the film. The second or further stretch may be to an extent less than the initial stretch or, if desired, go beyond this initial stretch and may also be followed by a further relaxation stage if desired. Still further stretch/relax stages could also be utilised at least without adversely affecting the barrier and UV resistant properties of the film.

It has been surprisingly found that by relaxing or partially relaxing the pre-stretched plastics material film, fibre or filament that has been stretched beyond its yield point results in a product that has a significantly increased resistance to gas (oxygen) transmissivity per unit thickness of the film, fibre or filament. Moreover, the material thus formed has an increased resistance to UV degradation per unit thickness of the material. In other words, if the film thickness is decreased by half in the pre-stretching process and relaxing, the gas transmissivity level ($cc/m^2/day$) is not increased to twice its original level as might be expected but is significantly lower than this. Moreover, it has been surprisingly found that putting the plastics material film through a second stretching process, does not significantly adversely affect gas transmissivity level of the film, at least to an extent that would prevent its use in forming an anaerobic envelope. It will of course be apparent that the material to be wrapped may be any product, group of products or material that might benefit from an anaerobic atmosphere.

The present invention, in accordance with one aspect, has particular application to the silage making industry. Traditionally silage was and sometimes still is produced by placing wilted cut grass within a pit for a period of time. More recently silage has been produced by wrapping wilted cut grass in an envelope of plastics material film, typically the cut grass being formed into a round bale and then wrapped in at least two layers of plastics material film. The film conventionally used for this purpose is of the order of 25 microns in thickness and is stretched under tension as it is applied to the bale to wrap the bale tightly. Typically the wrapping tension is achieved by stretching the film at the point of application to the bale by 55-75%. It is well recognised that for good silage production, it is necessary to substantially restrict or prevent as far as possible, the flow of oxygen to the cut grass wrapped in the plastic film. It is therefore conventional wisdom in the industry to wrap the bale in relatively thick film as it is believed this will restrict oxygen transmission through the plastics material film. Moreover, the film is normally applied with reasonably high tension to attempt to exclude or force air out of the bale as much as possible.

Thus, in accordance with a still further aspect, the present invention provides a method of making silage including the steps of forming a wrapping envelope about a bale of silage making material utilising an at least partially relaxed plastics material film pre-stretched before relaxation beyond its yield point to increase its length and decrease its thickness, applying said pre-stretched plastics material film to be wrapped in at least one layer to form said wrapping envelope whereby said wrapping envelope has an increased resistance to degradation from UV light radiation.

According to a still further aspect, the present invention provides a method of making silage, forming a wrapping envelope about said bale utilising an at least partially relaxed plastics material film pre-stretched before relaxation beyond its yield point to increase its length and decrease its thickness, applying said pre-stretched plastics material film to be wrapped in at least one layer to form said wrapping envelope whereby an anaerobic atmosphere therewithin is established within said wrapping envelope.

According to yet another aspect, the present invention provides a method of making silage including providing a bale of silage making material, and forming a wrapping envelope about said bale having at least one layer of a pre-stretched plastics material film that has been stretched beyond its yield point to form a film with reduced thickness and increased length, at least partially relaxing said film, and applying said pre-stretched plastics material film to said bale with at least sufficient tension to form said wrapping envelope with an anaerobic atmosphere therewithin.

In accordance with yet another aspect, the present invention provides a method of making silage including providing a bale of silage making material, forming a wrapping envelope about said bale utilising a plastics material film that has been first stretched beyond its yield point to increase its length and decrease its thickness and thereafter at least partially relaxed, said plastics material film undergoing a secondary stretch after being at least partially relaxed, applying said plastics material film to be wrapped in at least one layer about said bale to form said wrapping envelope with an anaerobic atmosphere therewithin.

Preferably the aforesaid secondary stretch occurs prior to the film being applied to said bale. Alternatively, the secondary stretch may occur as the film is applied to the bale. Conveniently the secondary stretch may be either lower than or beyond the initial or pre-stretch level and may incorporate another relaxation step.

Conveniently the envelope is formed by at least two layers. Preferably, the envelope is formed by three, four or six layers.

Conveniently, the plastics material film for silage production is a linear low density polyethylene stretch film, preferably an octane, butene or hexthene. Preferably the film has been pre-stretched or is first stretched beyond its yield point to an extent sufficient to increase its length by at least 75% and preferably by at least 100%. Preferably the film is initially about 25 to 50 microns thick and after the first stretch or pre-stretching it has a thickness of between 10 and 15 microns.

The term "anaerobic atmosphere" used above and hereinafter is intended to identify an atmosphere that has minimal oxygen gas therein or flowing thereto to the extent sufficient for the material within the wrapped envelope to benefit satisfactorily therefrom. The terms "relaxed" or "relaxing" when referring to pre-stretched plastics material is intended to mean that the film is relaxed by a percentage of the total stretched length, preferably uniformly across the width or cross-section of the plastics material. The film may contain some residual memory that in the absence of any restraining forces would cause the film to slowly contract in length over time. The terminology "secondary stretch" or "secondary stretching" used above and hereinafter refers to that percentage of elongation applied to the film after stretching and relaxing or partially relaxing. The term "gas" used herein is intended to include "water vapour" and vapours of other fluids. The processes of this invention may be achieved by "cold" (i.e. atmospheric temperature) stretching and relaxation or it may be conducted in some cases by first heating the film, fibre or filament.

While the invention has been described herein as requiring stretching of the film in one direction beyond its yield point and at least partially relaxing in the same direction, the invention does include within its scope biaxial stretching. The stretching may occur simultaneously in two directions or may be stretched sequentially in two perpendicular directions. The at least partial relaxation may also occur simultaneously or sequentially in the two directions.

The present invention will hereinafter be described with reference to the accompanying drawings and examples set out in the following. In the annexed drawings:—

Figure 1:
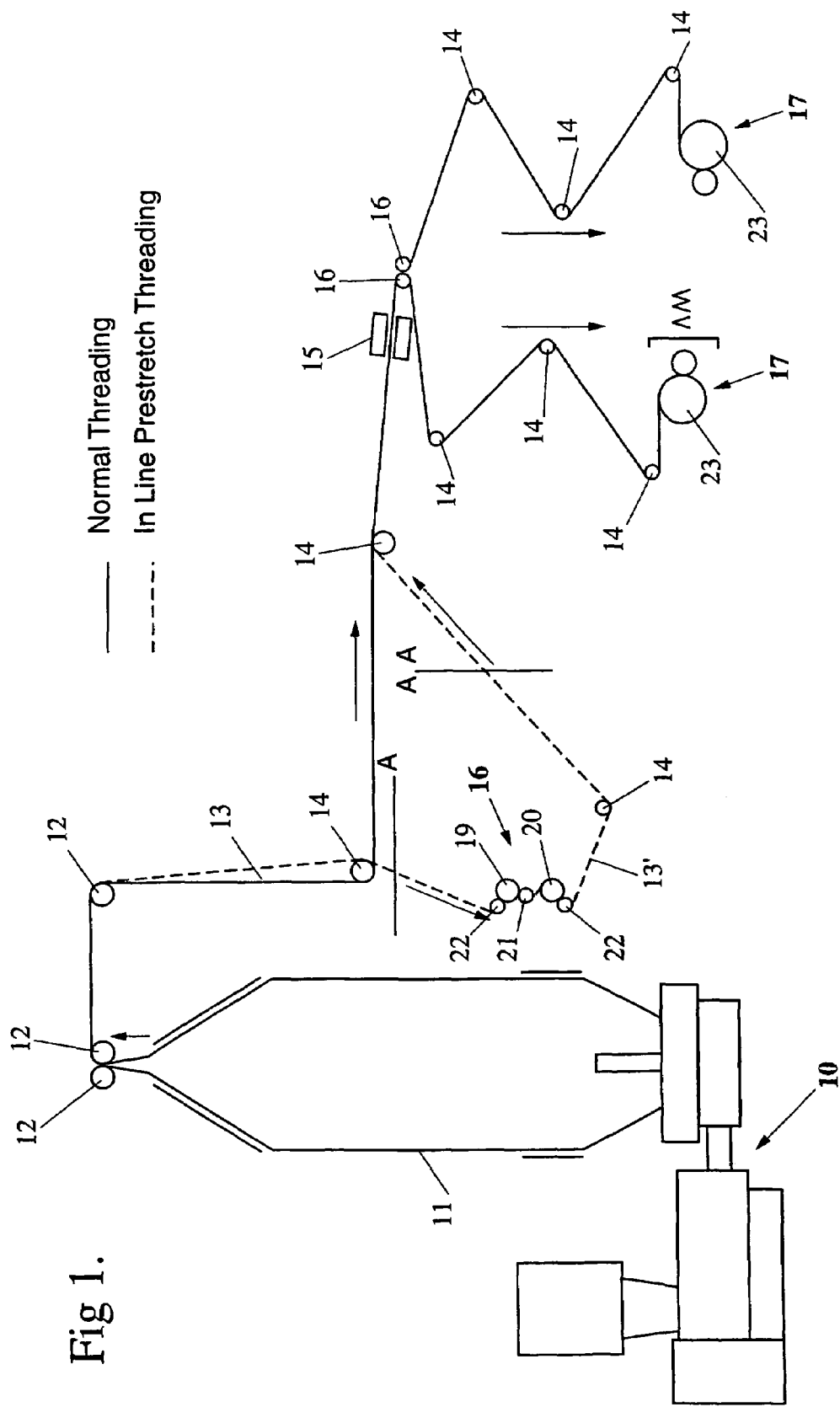
FIG. 1 illustrates an apparatus and method for producing pre-stretched plastics material film in accordance with one embodiment of the invention.

FIG. 1 illustrates a method of producing pre-stretched plastics material film wherein an extruder 10 operates in a known manner to generally inflate a film bubble 11 which is drawn up from the extruder 10 passing through primary nip rollers 12 to collapse the bubble. From the primary nip rollers 12 the plastics material film 13 is passed via idler rollers 14, via a film trimming and/or splitting station 15, to secondary nip rollers 16 to be wound upon film winding rollers 17.

The plastics material film 13 may undergo a stretch process by following the path 13' shown in dashed outline via an in-line stretching unit 18 shown from A to AA. Alternatively, stretching of the film may occur as a separate process by taking a roll of film 23 produced as shown in FIG. 1 and passing same through a stretching unit 18 as shown from A to AAA of FIG. 1 omitting of course the splitting unit 15. In either case the stretching unit 18 includes a low speed roller 19 and a high speed roller 20 with stretching of the film 13' occurring generally between these two rollers. The secondary nip rollers 16 are driven at a speed similar to the high speed roller 20 with substantially complete relaxation (to the extent possible) of at least the elastic deformability of the film occurring between the secondary nip rollers 16 and the wind up roller 17. Each of the rollers 19, 20 has an associated idler nip roller 22 and there may be provided between the rollers 19, 22 and 20, 22, a film width adjustment roller 21.

The above described arrangement permits, by adjusting the relative speeds of the rollers 19 and 20, a stretching of the plastics material film beyond its yield point to simultaneously lengthen the film and reduce its thickness. By appropriately adjusting the speeds of the rollers, it is possible to vary the stretching of the film beyond its yield point to achieve desired film lengthening and film thickness reductions. For example, a plastics material film that is stretched to twice its length will have approximately half its original thickness.

In the following example, a plastics material film initially at 21 microns thickness was stretched beyond its yield point to effectively reduce its thickness by half, that is 10.5 microns. The plastics material film was tested prior to stretching and after stretching to determine its capability of resisting oxygen transmission. Each film, i.e. the 21 micron non-stretched film and the 10.5 micron pre-stretched film (after initially relaxing) was then stretched a further 10% within the retained elasticity of the film in each case to simulate the application of each sample to a bale for the purpose of making silage under a small tension force. The oxygen transmissivity of the film in each case was further tested and the results obtained are set out in the following table.

| Sample (low density polyethylene plastics material film) | Film Thickness (microns) | Oxygen transmissivity (cc/m²/day)(no further stretching) | Oxygen transmissivity (cc/m²/day) (after elastic stretching of 10%) |
|---|---|---|---|
| A (not stretched) | 21 | 14,000 | 21,600 |
| B (sample A pre-stretched beyond its yield point) | 10.5 | 17,400 | 18,700 |

It will be apparent from the foregoing figures that by pre-stretching the film to approximately half its thickness, there surprisingly results only a 24.3% increase in the oxygen transferred through the film compared to the doubling that might have been expected by the halving of the film thickness. Even more surprising is that if the 10.5 micron film is stretched again by a further 10%, the percentage increase in oxygen transmissivity is only 7.5% compared to 54% for the 21 micron film if it is stretched by a similar 10% and in fact the resistance to oxygen, transferral through the 10.5 micron film is actually better at this point than it is for the 21 micron film that has not been pre-stretched.

In another example linear low density polyethylene film of initially generally 24 microns thick (samples A/B) was stretched to the degree that would normally occur when applying same to a bale during forming a silage making envelope to create samples C and D. Sample C has a 55% stretch level and sample D has a 70% stretch level simulating the usual degrees of stretch when applying normal silage making film to a bale. Samples E/F are the film of A/B that has been pre-stretched to beyond its yield point, the stretch being by 150% to increase its length and decrease its thickness. That is to say if the film was 100 m long initially, after the pre-stretch it would be 250 m long. The samples of E/F, after the pre-stretch stage have been relaxed by about 18% of the total, stretched length. Finally the samples G/H are the film of samples E/F that has undergone a secondary or further stretch of 33% of the relaxed state. The following table lists the samples, the approximate thickness of each sample and the tested oxygen transmissivity (cc/m²/day).

| Sample | Thickness (Microns) | Oxygen Transmissivity |
|---|---|---|
| A | 24 | 12170 |
| B | 24 | 10900 |
| C | 18 | 18600 |
| D | 17 | 21300 |
| E | 13 | 14550 |
| F | 13 | 12600 |
| G | 12 | 13660 |
| H | 12 | 13370 |

It will be apparent from the foregoing that samples E to H are approximately half the thickness of samples A and B and their oxygen transmissivity is not significantly greater than for samples A and B. More particularly, however, the samples G and H show that placing the pre-stretched plastics film through a secondary stretch to a level even greater than the pre-stretch level, also does not significantly affect the oxygen transmissivity levels.

In still further examples, clear polyethylene stretch film nominally of a thickness of 50 microns was used. The film was stretched generally uniformly across its width to beyond its yield point to varying degrees and either not relaxed at all or relaxed to varying degrees substantially uniformly across its width. Various samples of the unstretched and stretched films were then tested for oxygen permeability and the results of these tests are set out in the following table. It should be noted that the test equipment had an upper limit of 24,000 cc/m²/day and any gas permeability tested that was above this limit could not be established. The film thickness or gauge was established as an average thickness by utilising the weight and area of the samples tested. The normalised permeability figure is a figure normalised with regard to thickness relative to the unstretched sample.

| Film Treatment | Film Gauge (microns) | Average gas permeability (cc/m²/day) | Normalised Permeability (cc/m²/day) |
|---|---|---|---|
| 1. Unstretched film | 46.3 | 5580 | 5580 |
| 2. Stretched by 182% and not relaxed | 19.5 | >24,000 | >10,108 |
| 3. Stretched by 155% and relaxed by 5.8% | 20.6 | 19,000 | 8454 |
| 4. Stretched by 145% and relaxed by 11% | 21.8 | 9546 | 4495 |
| 5. Stretched by 148% and relaxed by 15.7% | 22.5 | 8820 | 4286 |
| 6. Stretched by 180% and relaxed by 20% | 25.0 | 6467 | 3492 |

It is believed the foregoing figures show a significant gas permeability reduction between tests 2 and 3 whereby at or around a 5% relaxation rate a reduction in gas permeability might be expected. Even more significant advantages are achieved when the relaxation level is around 10% or greater than compared with the same unstretched film.

In further testing UV stability of plastics material film produced according to the present invention was tested and compared to the same unstretched film. The film tested was 25 micron thick clear polyethylene film. This film was tested in an unstretched condition and also after being stretched beyond its yield point by 70% and not relaxed (gauge 17.2 microns) and secondly stretched beyond its yield point to 150% and thereafter relaxed by 20% so as to have a thickness of 13.0 microns. These films were then tested in a UV light chamber with a fluorescent lamp (313 nm) under standard UNE 53-104 (70° C.). The method utilised allowed for evaluation of the UV degradation of films under stretched conditions ["Cast Silage Wrap Film Evaluation", A. Manrique and C. Liop, CRI report LAIT 4032, Oct. 22, 1990]. The results applicable to the stretched and relaxed film were normalised given the difference in thickness between the non-stretched film and the stretched film. The results of this testing are set out in the following table:—

| | Hours to failure of 25 micron film | Hours to failure of film stretched by 70% and not relaxed | Hours to failure of film stretched by 150% and relaxed by 20% |
|---|---|---|---|
| Clear film | 140 | 97.4 | 269 |

Clearly the film that was stretched and not relaxed performed worse than the other two and the film that was stretched and relaxed performed better than both the other samples tested.

Figure 2:
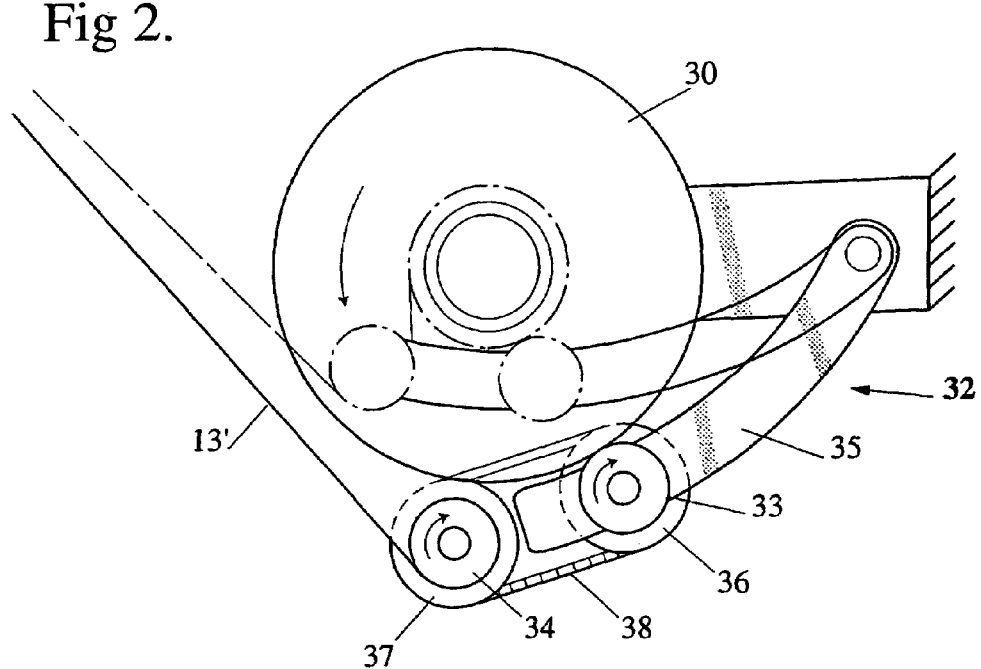
FIG. 2 depicts an end view of a portion of a mechanism for applying pre-stretched plastics material film to a bale for producing silage, in accordance with one embodiment of the invention.
Figure 3:
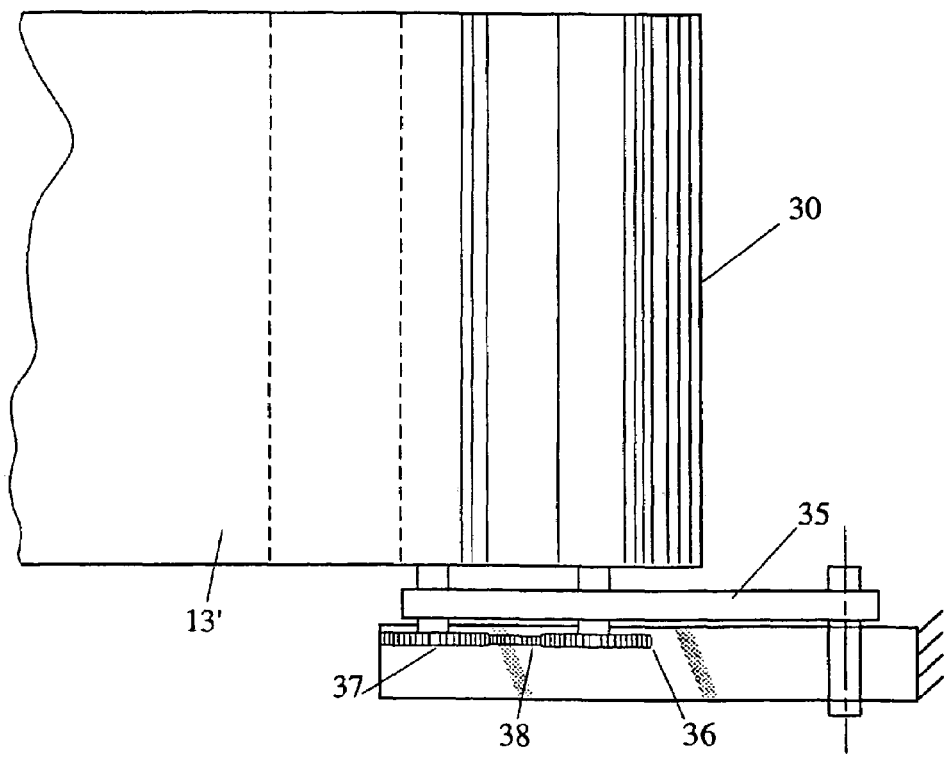
FIG. 3 depicts a side view of the portion of FIG. 2.
Figure 4:
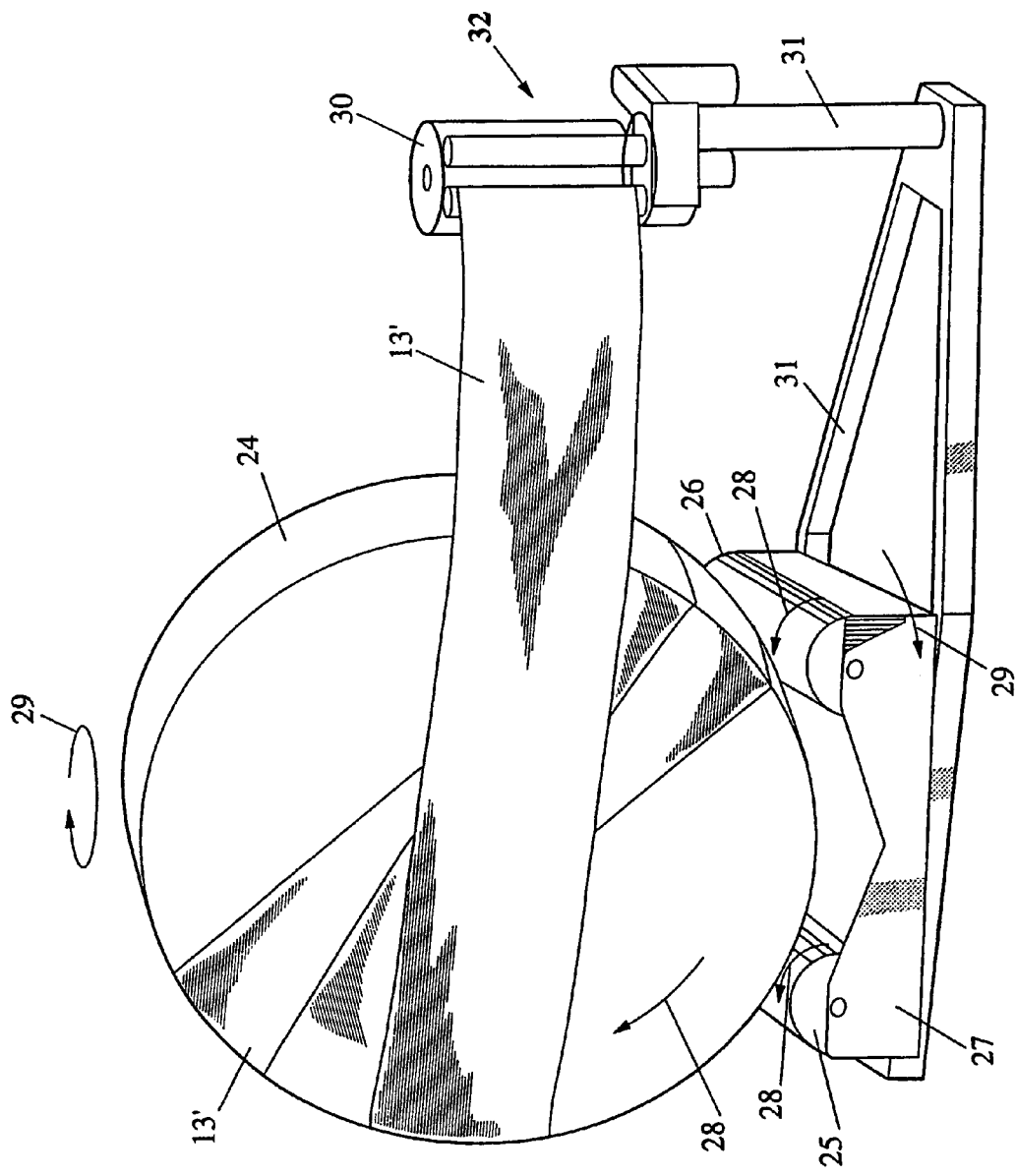
FIG. 4 is a perspective view of the mechanism for applying pre-stretched plastics material film to a bale.

Referring now to FIGS. 2 to 4, there is illustrated one possible means of applying pre-stretched plastics material film 13' to a bale for producing silage. A similar process may be used for any other material, product, or combination of products where the current process would prove useful.

In this arrangement the bale 24 is supported on rollers 25, 26 carried by a rotatable frame 27. The rollers 25, 26 are driven to rotate the bale 24 about its axis as indicated by arrows 28. At the same time, the frame 27 and the bale 24 carried thereby is rotated as indicated by arrows 29. As is shown best in FIG. 4, film 13' is led from a roll 30 of such film rotatably supported on a frame 31 to be sequentially applied in overlapping sections to the bale 24 as shown in FIG. 4. Typically the bale 24 would be covered in at least two and sometimes three layers of such film to form a wrapping envelope. FIGS. 2 and 3 illustrate one mechanism 32 for outfeeding of the film from the roll 30. In this example, the mechanism 32 includes a pair of rollers 33, 34 mounted on a swinging arm 35 urged in a direction such that the first roller 33 engages and is driven by rotation of the roll of film 30. The film 13' itself is led from the roll 30 around the second roller 34 to the bale 24. The roller 34 is driven at a speed in direct relationship to the speed of the first roller 33 by a pair of sprocket wheels 36, 37 and a sprocket chain 38. The size of the sprocket wheels 36, 37 is approximately equal so that no tension is imparted to the film 13' by the rollers 33, 34 rotating at different speeds. It may, however, be desirable to impart a small tension to the film 13' at this point and in consequence the roller 34 may be arranged to rotate at a speed sufficient to impart up to 40% elongation in the film at this point, preferably of the order of 30% elongation. In some cases it may be desirable to have secondary relaxation up to 10%.

The invention claimed is:

1. A method of forming a plastics material product including:
   providing a plastics material member being a film web,
   stretching said member at atmospheric temperature biaxially beyond its yield point to decrease its thickness and increase its length and width,
   partially relaxing in a longitudinal stretching direction said stretched plastics material member substantially uniformly across its cross-section transverse to the longitudinal stretching direction by between 5 and 20% of its total stretched length, and
   also relaxing said member transverse to said longitudinal stretching direction, to form said product whereby the plastics material member achieves either or both:
      (i) an improved resistance, which is uniform across the plastics material member's transverse width, to degradation from UV light radiation, and
      (ii) an improved resistance, which is uniform across the plastics material member's transverse width, to oxygen or other gas transmissivity.

2. A method according to claim 1, wherein said stretched plastics material member is relaxed by at least 10% of its total stretched length.

3. A method according to claim 1, wherein after said partial relaxation, said plastics material member is fixed at said length whereby further relaxation is prevented.

4. A method according to claim 3, wherein said fixing of the length of said plastics material member is through a process such as an annealing process.

5. A method according to claim 1, wherein said plastics material member is a film web and said film is laminated with at least one other film of plastics or other material.

6. A method according to claim 1 wherein said biaxial stretching occurs simultaneously in two perpendicular directions.

7. A method according to claim 1 wherein said biaxial stretching occurs sequentially in two perpendicular directions.

8. A method of wrapping a material, object or objects, to create an anaerobic atmosphere within a wrapping envelope, said method including providing a relaxed plastics material film with a decreased oxygen permeability uniformly across a transverse cross-section of said film, said film being pre-stretched at atmospheric temperature biaxially beyond its yield point to increase its length and width and decrease its thickness, the transverse cross-section being transverse to a longitudinal stretching direction, and said film being relaxed in the transverse direction and also substantially uniformly relaxed across the transverse cross-section in said longitudinal stretching direction by between 5 and 20% of said plastic material film's total stretched length, and applying said plastics material film to be wrapped in at least one layer with at least sufficient applied further tension to form said wrapping envelope with an anaerobic atmosphere therewithin.

9. A method according to claim 8, wherein the object is a bale of silage making material.

10. A method of making silage, including providing a bale of silage making material, forming a wrapping envelope about said bale utilising a partially relaxed plastics material film with a decreased oxygen permeability uniformly across a transverse cross-section of said film, said film being pre-stretched at atmospheric temperature biaxially beyond its yield point to increase its length and width and decrease its thickness, the transverse cross-section being transverse to a longitudinal stretching direction, and said film being relaxed in the transverse direction and also substantially uniformly relaxed across the transverse cross-section in said longitudinal stretching direction by between 5 and 20% of said film's total stretched length, and applying said plastics material film to be wrapped in at least one overlapping layer to form said wrapping envelope with an anaerobic atmosphere therewithin.

11. A method according to claim 10, wherein the plastics material film is applied to said bale with at least sufficient tension to form said wrapping envelope with an anaerobic atmosphere therewithin.

12. A method according to claim 11, wherein said plastics material film undergoes a secondary stretch in said longitudinal direction after being at least partially relaxed, and thereafter applying said plastics material film to be wrapped in at least one layer about said bale to form said wrapping envelope with an anaerobic atmosphere therewithin.

13. A method according to claim 12, wherein said secondary stretch occurs prior to the film being applied to said bale.

14. A method according to claim 12, wherein said secondary stretch occurs as the film is applied to said bale.

15. A method according to claim 12, wherein the secondary stretch is beyond the level of the initial stretching of said film in the longitudinal direction.

16. A method according to claim 12, wherein the secondary stretch is less than the level of the initial stretching of said film in the longitudinal direction.

17. A method of making silage, including providing a bale of silage making material, providing a plastics material film having a longitudinal direction and a transverse direction, said film having been uniformly pre-stretched at atmospheric temperature in the longitudinal direction beyond the film's yield point to increase the film's length and width and decrease the film's thickness, the film being relaxed in the transverse direction and also substantially relaxed across the transverse cross-section in said longitudinal direction by between 5 and 20% of said film's total pre-stretched length, forming a wrapping envelope about said bale utilising said pre-stretched and partially relaxed film by wrapping said plastics film about said bale while exerting a secondary stretch in the longitudinal direction of said plastics film to further increase the film's length and decrease the film's thickness such that said plastics film is arranged in at least one overlapping layer to form said wrapping envelope and exhibits both a decreased oxygen permeability across the plastics film traverse width and an improved resistance to degradation from UV light radiation uniformly across the plastics film transverse width.

18. A method according to claim 17 wherein the secondary stretch imparts up to 40% elongation in the longitudinal direction of the plastics material film.

19. A method according to claim 18 wherein after the secondary stretch, the plastics material film undergoes a secondary relaxation.

20. A method according to claim 19 wherein the secondary relaxation step relaxes the film up to 10% of its total stretched length.

* * * * *